(No Model.)
A. C. MATHER.
VEHICLE PROPELLER.
No. 442,985. Patented Dec. 16, 1890.
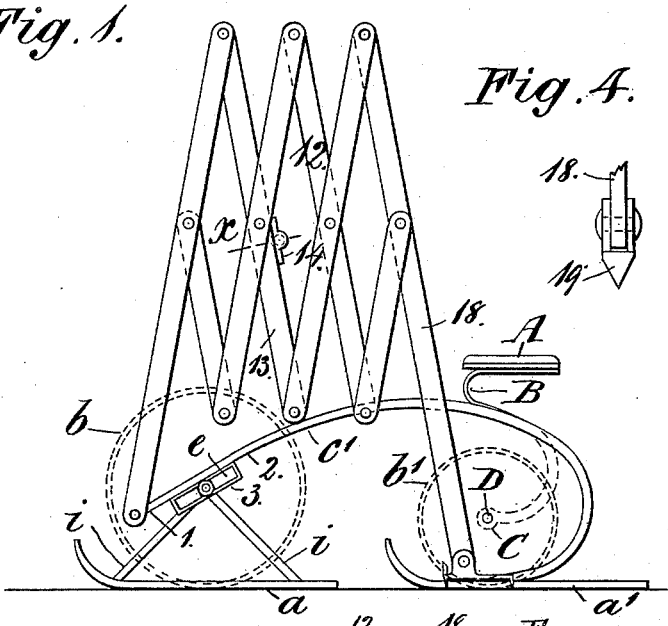
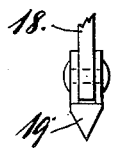
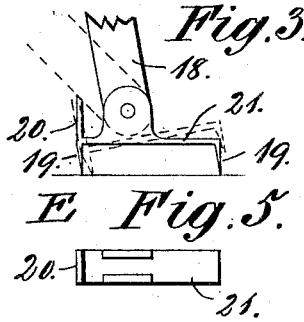
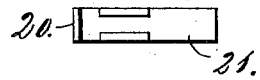
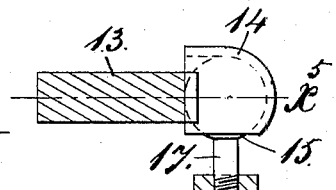
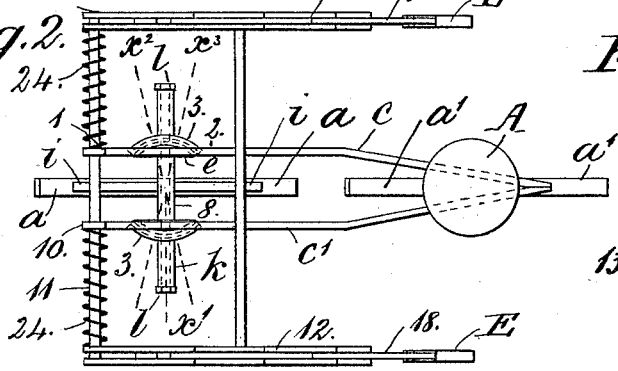
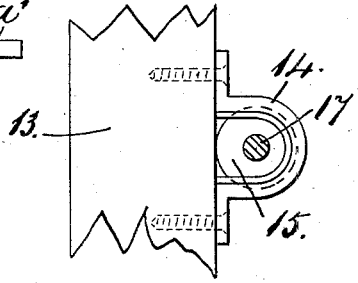
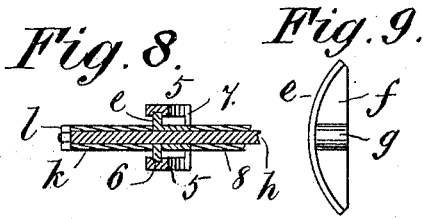
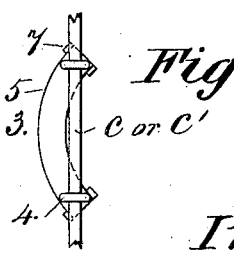
Witnesses.
Charles G. C. Simpson
John Morrison
Inventor.
A. C. Mather

UNITED STATES PATENT OFFICE.

ALEXANDER C. MATHER, OF MONTREAL, CANADA.

VEHICLE-PROPELLER.

SPECIFICATION forming part of Letters Patent No. 442,985, dated December 16, 1890.

Application filed May 12, 1890. Serial No. 351,574. (No model.)

*To all whom it may concern:*

Be it known that I, ALEXANDER CRAIG MATHER, a subject of the Queen of Great Britain, and a resident of the city of Montreal, in the district of Montreal and Province of Quebec, Canada, have invented new and useful Improvements in the Propulsion of Vehicles, of which the following is a specification.

My invention relates to improvements in the means by which vehicles may be propelled by manual power; and the objects of my invention are to provide a better means of operating the mechanism by which such propulsion is obtained; also more suitable means of steering or guiding the vehicle, and other advantages which will be hereinafter set forth and claimed. I attain these objects by the mechanism illustrated in the accompanying drawings, in which similar letters and numerals of reference indicate like parts.

Figure 1 is a side elevation of a vehicle embodying my invention. Fig. 2 is a plan view of the vehicle shown in Fig. 1. Fig. 3 is a side elevation of the shoe of the lazy-tongs. Fig. 4 is a back elevation of the parts shown in Fig. 3. Fig. 5 is a plan view of the shoe. Fig. 6 is a section, on a larger scale, of the limb 13, with ball and socket, taken at line $x$, Fig. 1. Fig. 7 is a side elevation of the parts shown in Fig. 6. Fig. 8 is a vertical section taken at line $x'$, Fig. 2. Fig. 9 is a plan view of the segment $e$ detached. Fig. 10 is a plan view of the segment 3, showing the attachment of it to one of the backbones.

The vehicle, which is in itself of the nature of a bicycle, may be either provided with runners $a\ a'$, as indicated by solid lines in Fig. 1, or it may be provided with wheels, as indicated by the dotted circles $b\ b'$.

$c\ c'$ are the backbones, the front ends from between the points 1 and 2 of which are inclined at an angle, say, of about thirty degrees.

A is a seat attached on springs B, formed on or attached to the backbones $c\ c'$.

When the vehicle is provided with wheels, the back ends of the backbones are brought to the desired position, and each provided with eyes C, one on each side of the wheel, adapted to carry the axle D.

In this specification I shall make use of the words "the vehicle," and such must be understood (for the sake of brevity and clearness) to mean the wheels or runners, as the case may be, the backbones, and seat. To the front part or between 1 and 2 of the backbones are attached, as shown in Figs. 1 and 10, the segments 3 by staples 4, so that the segments also are at an angle of about thirty degrees. The segments 3 are made in two parts, provided with circular grooves at 6, and united together by means of straps 7 at their ends.

$e$ are segments. These consist of circular plates made to agree with the grooves 6 and fitted to slide freely therein, having a web $f$ and a hub $g$, provided with a bore for the axial rod $h$ to pass through.

8 is a sleeve through which the rod $h$ passes. When the runners are used, this sleeve is made integral with the legs $i$, attached in any ordinary way or made in one with the runners, as desired; but when wheels are used this sleeve forms, with the rod $h$ inside it, the axle upon which the wheel $b$ revolves. The rod $h$ extends out on both sides beyond the segments $e$, (see Figs. 2 and 8,) and on such extensions are placed sleeves or other desired foot-rests $k$, the whole being secured together by nuts $l$, screwed to fit the screwed ends of the rod $h$, the whole also being fitted to slide freely, and by the rider placing his feet upon the foot-rests $k$ the vehicle may be steered or guided as desired by turning the rod $h$ and parts attached thereon about as indicated by the lines $x^2\ x^3$ in Fig. 2. At the same time that the axle is turned about, as last above mentioned, the inclination of the segments 3 causes one edge of the runner $a$ to be raised and the other depressed, and thus "bite" upon the ice. This is looked upon as an important improvement, as it adds very materially to the certainty of turning and prevents the runner from slipping sidewise on the ice. It also slightly inclines the legs $i$ or wheel $b$, as the case may be, in the proper direction to assist in turning and overcome the centrifugal force that is thereby developed.

At the front end of the backbones eyes 10 are formed, carrying a rod 11, on the ends of which is pivoted the propelling mechanism, which consists of the lazy-tongs 12, to the limbs 13 of which are attached, as shown, sockets 14. These sockets must be so situated that a line $x^5$ drawn through the center of the limb (see Fig. 6) will pass through the center of the ball 15. The object of this will shortly appear. This is what I shall call the "ball and socket," being placed centrally with the lazy-tongs. The balls are made integral with screwed necks 17, which are screwed into the ends of a handle 16. If the center line $x^5$ did not pass through the center of the ball 15, an amount of side strain would be developed which would tend to throw the back ends of the lazy-tongs outward or inward when pulling on the handle 16, and this is looked upon as an important improvement, as it overcomes much of the difficulty that has been experienced with regard to the action of the lazy-tongs heretofore.

By the employment of the balls and sockets it enables the one lazy-tongs to be actuated more than the other in expanding the tongs and one to be pressed with greater force upon the ground or ice (as the case may be) more than the other, as desired; also, any unevenness of the ground, &c., may be compensated for. It is also an assistance on many occasions, particularly in turning. At the same time the arrangement is such that at the will of the rider both tongs may be equally operated by simply pulling and pressing equally on the handle 16.

Heretofore the last or back limb 18 of the tongs has been provided with a sharp point, either directly formed on it or on an attachment of it. This is objectionable, as when passing over soft ground the point will often run in so deep that much of the speed of the vehicle is taken away by the force required to extract it therefrom. Again, if the points are made blunt, so that they will not penetrate deep into the ground, (or ice,) they lose their hold very quickly, as the limb 18 becomes much inclined. To overcome these difficulties, I have provided a shoe E. (See Figs. 1, 3, 4, and 5.) This shoe is pivoted to the end of the limb 18, and is provided with points 19 and a forward projection 20, so adjusted that when the limb has reached about the angle shown by dotted lines a further inclination of the limb will cause the shoe to cant up, as indicated by dotted lines in Fig. 3; but the hold upon the ground, &c., will be retained by the forward points 19 of the shoes. The flat plate 21, which forms the body of the shoe, prevents the points 19 from running too deeply into the ground, &c., and the points themselves may be made of such length and sharpness as will be found generally best suited for the surface to which they are applied.

To compensate for the overhanging weight of the lazy-tongs on the ends of the rod 11, as shown in Fig. 2, spiral springs are attached, which may be in tension what is desired, or as nearly as possible balance the weight of the tongs, and thus relieve the rider of their weight when making the return-stroke.

What I claim is as follows:

1. The combination, with a vehicle, of the lazy-tongs having shoes provided with points and adapted to be canted, the whole substantially as described.

2. The combination, with a vehicle, of the lazy-tongs having balls and sockets attached centrally to the lazy-tongs, and having handle 16 attached to the two said balls with said handle, the whole substantially as described.

3. The combination, with a vehicle, of the inclined segments 3 and $e$, sleeve 8, foot-rests $k$, and axial rod $h$, the whole substantially as described.

4. The combination, with a vehicle, of a lazy-tongs 12 and springs 24, by which the weight of the tongs is wholly or in part sustained, substantially as described.

A. C. MATHER.

Witnesses:
CHARLES G. C. SIMPSON,
JOHN MORRISON.